US012640106B2

(12) United States Patent
Liu

(10) Patent No.: US 12,640,106 B2
(45) Date of Patent: May 26, 2026

(54) DISPLAY METHOD, DISPLAY DEVICE AND MOBILE TERMINAL FOR BACKLIGHT CONTROL USING UNEQUAL-DURATION SUB-PERIODS

(71) Applicants: Huizhou China Star Optoelectronics Display Co., Ltd., Huizhou (CN); TCL China Star Optoelectronics Technology Co., Ltd., Shenzhen (CN)

(72) Inventor: Jinfeng Liu, Huizhou (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 307 days.

(21) Appl. No.: 17/600,427

(22) PCT Filed: Jun. 18, 2021

(86) PCT No.: PCT/CN2021/100979
§ 371 (c)(1),
(2) Date: Jan. 21, 2025

(87) PCT Pub. No.: WO2022/257171
PCT Pub. Date: Dec. 15, 2022

(65) Prior Publication Data
US 2025/0149002 A1 May 8, 2025

(30) Foreign Application Priority Data
Jun. 7, 2021 (CN) ......................... 202110633391.0

(51) Int. Cl.
*G09G 3/34* (2006.01)

(52) U.S. Cl.
CPC ..... *G09G 3/342* (2013.01); *G09G 2300/0426* (2013.01); *G09G 2320/0271* (2013.01)

(58) Field of Classification Search
CPC ........... G09G 3/342; G09G 2300/0426; G09G 2320/0271; G09G 3/3208; G09G 3/3607;
(Continued)

(56) References Cited

U.S. PATENT DOCUMENTS

2007/0035498 A1 2/2007 Jeon
2018/0018924 A1 1/2018 Mao et al.
2021/0337642 A1* 10/2021 Wang .................. G09G 3/3426

FOREIGN PATENT DOCUMENTS

CN 102163390 8/2011
CN 103021310 4/2013
(Continued)

*Primary Examiner* — Rodney Amadiz

(57) ABSTRACT

A display method used includes: obtaining a plurality of illuminating data corresponding to the plurality of backlight units, the plurality of illuminating data are configured for the plurality of backlight units to display a frame within a predetermined time period. The predetermined time period is divided to a plurality of sub-periods. Two of the sub-periods are not equal. The illuminating data includes sub-illuminating data corresponding to the sub-periods, and the sub-illuminating data correspond to data voltages of different voltage levels. When each of the plurality of the sub-periods begins, inputting a scan signal into the scan line to allow the plurality of backlight units to receive the plurality of sub-illuminating data.

17 Claims, 2 Drawing Sheets

(58) Field of Classification Search
CPC ......... G09G 2320/0233; G09G 3/3426; G09G 3/2029; H05B 45/44; H05B 45/10; G02F 1/1336; G02F 1/133601
See application file for complete search history.

(56) References Cited

FOREIGN PATENT DOCUMENTS

| | | |
|---|---|---|
| CN | 107256691 | 10/2017 |
| CN | 111415628 | 7/2020 |
| CN | 111445868 | 7/2020 |
| CN | 112017603 | 12/2020 |

* cited by examiner

DISPLAY METHOD, DISPLAY DEVICE AND MOBILE TERMINAL FOR BACKLIGHT CONTROL USING UNEQUAL-DURATION SUB-PERIODS

RELATED APPLICATIONS

This application is a National Phase of PCT Patent Application No. PCT/CN2021/100979 having International filing date of Jun. 18, 2021, which claims the benefit of priority of Chinese Patent Application No. 202110633391.0 filed on Jun. 7, 2021. The contents of the above applications are all incorporated by reference as if fully set forth herein in their entirety.

FIELD AND BACKGROUND OF THE INVENTION

The present disclosure relates to a display technology, and more particularly, to a display method, a display device and a mobile terminal.

DESCRIPTION OF RELATED ARTS

When a display panel displays an image, the light sources of each of the backlight units could show different luminance levels. The gray value represents the luminance levels from the darkest to the brightest. If the number of the middle levels is greater, the display effect of the display panel is better.

However, the conventional display panel may not have a smooth transition between different gray values when the display panel is displaying if the backlight units cannot be accurately charged.

SUMMARY OF THE INVENTION

Technical Problems

One objective of an embodiment of the present disclosure is to provide a display method, a display device and a mobile terminal, which could effectively alleviate the above issue of unsmooth transition between different gray values if the backlight units cannot be accurately charged.

Solution to Problem

Technical Solutions

According to an embodiment of the present disclosure, a display panel used in a display panel is disclosed. The display panel includes a plurality of backlight units and a scan line and a data line electrically connected to the plurality of backlight units. The display method includes:

- obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels;
- inputting the plurality of illuminating data into the data lines;
- inputting a scan signal into the scan line to allow the plurality of backlight units to receive the plurality of sub-illuminating data when each of the plurality of the sub-periods begins.

Optionally, the predetermined time period is divided into a plurality of equal secondary sub-periods, and an $N^{th}$ sub-period of the plurality of sub-periods includes $2^{N-1}$ of the secondary sub-periods.

Optionally, the step of inputting the scan signal into the scan line to allow the plurality of backlight units to receive the plurality of sub-illuminating data when each of the plurality of the sub-periods begins includes:

- inputting the scan signal into the scan line to allow the plurality of backlight units when each of the plurality of the sub-periods of the $N^{th}$ sub-period begins such that the plurality of the secondary sub-illuminating data corresponding to the $N^{th}$ sub-period to the plurality of backlight units.

Optionally, each of the illuminating data includes A bits, a number of the sub-periods is B, and each of the sub-illuminating data includes A/B bits.

Optionally, the plurality of sub-illuminating data of the illuminating data includes $2^{A/B}$ different data voltages of different voltage levels.

Optionally, time durations of the plurality of the sub-periods gradually increase from a first sub-period to a $B^{th}$ sub-period.

Optionally, each of the bits of the illuminating data includes a corresponding luminance contribution, and time durations of the sub-periods are directly proportional to the luminance contribution of the bits of the corresponding sub-illuminating data.

According to an embodiment of the present disclosure, a display panel used in a display panel is disclosed. The display panel includes a plurality of backlight units and a scan line and a data line electrically connected to the plurality of backlight units. The display device includes:

- an obtaining module, configured to obtain a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels;
- a first input module, configured to input the plurality of illuminating data into the data lines;
- a second input module, configured to input a scan signal into the scan line to allow the plurality of backlight units to receive the plurality of sub-illuminating data when each of the plurality of the sub-periods begins.

Optionally, the predetermined time period is divided into a plurality of equal secondary sub-periods, and an $N^{th}$ sub-period of the plurality of sub-periods includes $2^{N-1}$ of the secondary sub-periods.

Optionally, the second input module includes:

- a sub-field input unit configured to input the scan signal into the scan line at the beginning of each of the plurality of secondary sub-periods of the sub-period, so as to input the plurality of the secondary sub-illuminating data corresponding to the $N^{th}$ sub-period to the plurality of backlight units $2^{N-1}$ times.

Optionally, each of the illuminating data includes A bits, a number of the sub-periods is B, and each of the sub-illuminating data includes A/B bits.

Optionally, wherein the plurality of sub-illuminating data of the illuminating data includes $2^{A/B}$ different data voltages of different voltage levels.

Optionally, time durations of the plurality of the sub-periods gradually increase from a first sub-period to a $B^{th}$ sub-period.

Optionally, each of the bits of the illuminating data includes a corresponding luminance contribution, and time durations of the sub-periods are directly proportional to the luminance contribution of the bits of the corresponding sub-illuminating data.

According to an embodiment of the present disclosure, a mobile terminal is disclosed. The mobile terminal includes a display device is used in a display panel that includes a plurality of backlight units, a scan line and a data line electrically connected to the plurality of backlight units. The display device includes:

an obtaining module, configured to obtain a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels;

a first input module, configured to input the plurality of illuminating data into the data lines;

a second input module, configured to input a scan signal into the scan line to allow the plurality of backlight units to receive the plurality of sub-illuminating data when each of the plurality of the sub-periods begins.

Optionally, the predetermined time period is divided into a plurality of equal secondary sub-periods, and an $N^{th}$ sub-period of the plurality of sub-periods includes $2^{N-1}$ of the secondary sub-periods.

Optionally, the second input module includes:

a sub-field input unit configured to input the scan signal into the scan line at the beginning of each of the plurality of secondary sub-periods of the sub-period, so as to input the plurality of the secondary sub-illuminating data corresponding to the $N^{th}$ sub-period to the plurality of backlight units $2^{N-1}$ times.

Optionally, each of the illuminating data includes A bits, a number of the sub-periods is B, and each of the sub-illuminating data includes A/B bits.

Optionally, the plurality of sub-illuminating data of the illuminating data includes $2^{A/B}$ different data voltages of different voltage levels.

Optionally, each of the bits of the illuminating data includes a corresponding luminance contribution, and time durations of the sub-periods are directly proportional to the luminance contribution of the bits of the corresponding sub-illuminating data.

Advantages of Invention

Beneficial Effect

The present disclosure provides a display method, a display device and a mobile terminal. The display method is used in a display panel including a plurality of backlight units and a scan line and a data line electrically connected to the plurality of backlight units. The display method includes: obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels; inputting the plurality of illuminating data into the data lines; and when each of the plurality of the sub-periods begins, inputting a scan signal into the scan line to allow the plurality of backlight units to receive the plurality of sub-illuminating data. In the display method of the present disclosure, because at least two sub-periods have different time duration and the sub-illuminating data correspond to the data voltages of different voltage levels such that at least two sub-illuminating data of the illuminating data corresponding to each of the backlight unit are applied on the backlight units in different time durations. This could more accurately charge the backlight units under different gray values because time durations of at least two sub-periods are not equal such that the above-mentioned unsmooth transition between different gray values could be alleviated.

BRIEF DESCRIPTION OF THE SEVERAL VIEWS OF THE DRAWINGS

Description of Attached Drawings

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

EMBODIMENTS OF INVENTION

Figure 1:
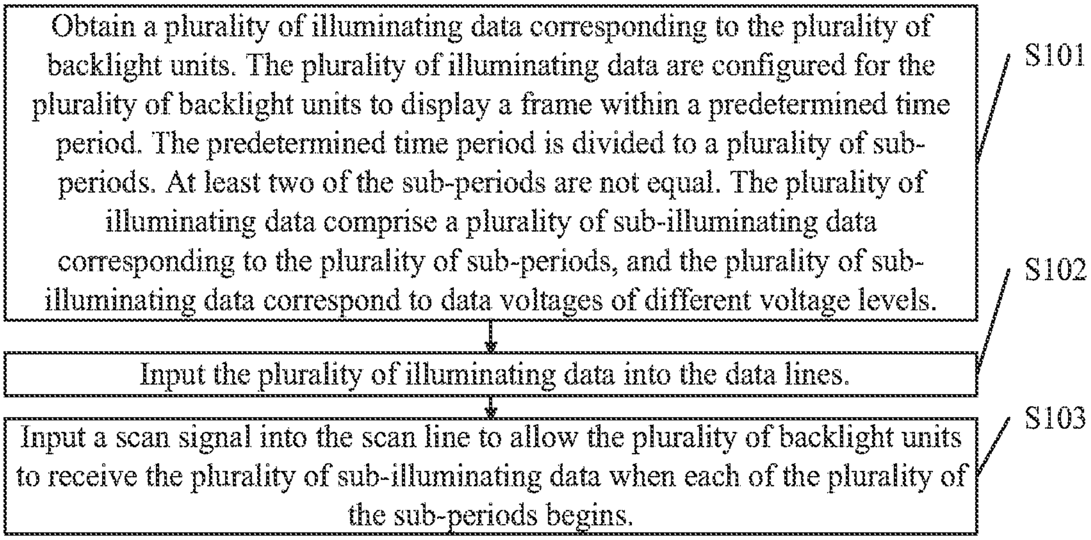
FIG. 1 is a flow chart of a display method according to an embodiment of the present disclosure.

Detailed Description of Specific Embodiments of the Invention

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

It is understood that terminologies, such as “center,” “longitudinal,” “horizontal,” “length,” “width,” “thickness,” “upper,” “lower,” “before,” “after,” “left,” “right,” “vertical,” “horizontal,” “top,” “bottom,” “inner,” “outer,” “clockwise,” and “counterclockwise,” are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification. In addition, the term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features. In the description of the present disclosure, the meaning of “plural” is two or more, unless otherwise specifically defined.

All of the terminologies containing one or more technical or scientific terminologies have the same meanings that persons skilled in the art understand ordinarily unless they are not defined otherwise. For example, “arrange,” “couple,” and “connect,” should be understood generally in the embodiments of the present disclosure. For example, “firmly connect,” “detachablely connect,” and “integrally connect” are all possible. It is also possible that “mechanically connect,” “electrically connect,” and “mutually communicate” are used. It is also possible that “directly couple,” “indirectly couple via a medium,” and “two components mutually interact” are used.

All of the terminologies containing one or more technical or scientific terminologies have the same meanings that persons skilled in the art understand ordinarily unless they are not defined otherwise. For example, “upper” or “lower” of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

In contrast to the conventional display panel, which may not accurately charge the backlight units such that the display panel may not have a smooth transition between different gray values, the present disclosure could effectively alleviate the above issue.

Please refer to FIG. 1. FIG. 1 is a flow chart of a display method according to an embodiment of the present disclosure. The display method is used in a display panel including a plurality of backlight units and a scan line and a data line electrically connected to the plurality of backlight units. The display method includes:

Obtaining step S101: obtaining a plurality of illuminating data corresponding to the plurality of backlight units. The plurality of illuminating data are configured for the plurality of backlight units to display a frame within a predetermined time period. The predetermined time period is divided to a plurality of sub-periods. At least two of the sub-periods are not equal. The plurality of illuminating data include a plurality of sub-illuminating data corresponding to the plurality of sub-periods, and the plurality of sub-illuminating data correspond to data voltages of different voltage levels.

First input step S102: inputting the plurality of illuminating data into the data lines.

Second input step S103: inputting a scan signal into the scan line to allow the plurality of backlight units to receive the plurality of sub-illuminating data when each of the plurality of the sub-periods begins.

In the above step S101, the processor could obtain a plurality of illuminating data from a timing controller or a field programmable gate array (FPGA). In this embodiment, the illuminating data corresponding to each of the backlight units have A bits (that is, $0^{th}$ bit to $(A-1)^{th}$ bit). Each of the A bits carries a binary datum 0 or 1. The $0^{th}$ bit is the least significant bit and the $(A-1)^{th}$ bit is the most significant bit. At this time, each backlight unit includes $2^A$ gray values. That is, each of the backlight units could generate light of $2^A$ different luminance levels.

The predetermined time period for the backlight units to display a frame could be divided into B sub-periods. Corresponding to the B sub-periods, the illuminating data having A bits could be divided into B sub-illuminating data. Each of the B sub-illuminating data has A/B bits. Accordingly, the B sub-illuminating data have different data voltages of $2^{A/B}$ different voltage levels.

In this embodiment, the lower bits have lower luminance contribution in each illuminating data and the higher bits have higher luminance contribution in each illuminating data when the backlight units display images. Therefore, the time duration of the lower bits should be applied for a shorter time period than that of the higher bits. In addition, because each of the illuminating data is outputted in an order from its lower bits to its higher bits, the time duration of the B sub-periods increases from its first sub-period to the $B^{th}$ sub-period. In another embodiment, in each of the illuminating data, if the lower bits also have lower luminance contribution in each illuminating data and the higher bits also have higher luminance contribution, the time duration of B sub-periods could be divided as follows: the time duration of the sub-period corresponding to the sub-illuminating data of lower bits could be longer than the time duration of the sub-period corresponding to the sub-illuminating data of higher bits. For example, the first B/2 sub-periods could have the same time duration, the last B/2 sub-periods could have the same time duration, and the time duration of the first B/2 sub-periods is shorter than the time duration of the last B/2 sub-periods. Please note, the luminance contribution of each of the bits of the illuminating data could be obtained by the processor when the processor obtains each of the illuminating data.

On the other hand, in each of the illuminating data, if the lower bits also have higher luminance contribution in each illuminating data and the higher bits also have lower luminance contribution, the time duration of B sub-periods should be divided as follows: the time duration of the sub-period corresponding to the sub-illuminating data of lower bits could be shorter than the time duration of the sub-period corresponding to the sub-illuminating data of higher bits.

In each of the illuminating data, if the lower bits have lower luminance contribution in each illuminating data, the middle bits have middle luminance contribution, and the higher bits have higher luminance contribution, the time duration of B sub-periods should be divided as follows: the time duration of the sub-period corresponding to the sub-illuminating data of lower bits could be comparatively shorter, the time duration of the sub-period corresponding to the sub-illuminating data of middle bits could be comparatively middle, and the time duration of the sub-period corresponding to the sub-illuminating data of middle bits could be comparatively longer.

The processor divides the time duration of the sub-periods according to the luminance contribution of each of the bits in the illuminating data.

In this embodiment, the predetermined time is divided into a plurality of secondary sub-periods. The $N^{th}$ sub-period of above-mentioned B sub-periods has $2^{N-1}$ secondary sub-periods.

The second input step S103 includes: when each of the plurality of the secondary sub-periods of the $N^{th}$ sub-period begins, inputting a scan signal into the scan line such that the plurality of sub-illuminating data corresponding to the N $N^{th}$ sub-period for $2^{N-1}$ times to the plurality of backlight units.

For example, each illuminating data corresponding to each backlight unit has 12 bits. The predetermined time for the backlight units to displaying a frame is divided into 6 sub-periods. Corresponding to the 6 sub-periods, the illuminating data of the 12 bits are divided into 6 sub-illuminating data. Each of the sub-illuminating data has 2 bits. At this time, the 6 sub-illuminating data has 4 data voltages of different voltage levels. That is, the sub-illuminating data could be 00, 01, 10 or 11, corresponding to 4 different data voltage V1, V2, V3 and V4 having different voltage levels.

The sub-period 1 has $2^0$ secondary sub-period, the sub-period 2 has $2^1$ secondary sub-periods, the sub-period 3 has $2^2$ secondary sub-periods, etc . . . and the sub-period 6 has $2^5$ secondary sub-periods.

Figure 2:
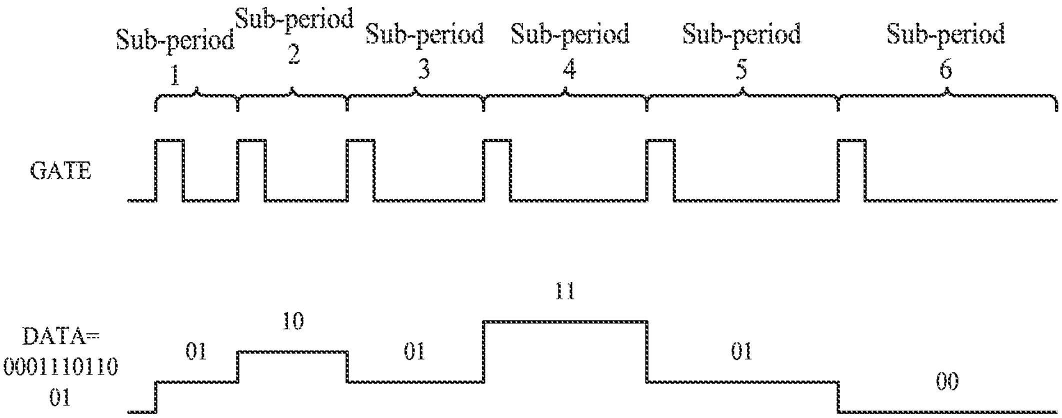
FIG. 2 is a diagram showing signal waveforms of a display method according to an embodiment of the present disclosure.

Please refer to FIG. 2. The illuminating data (DATA) corresponding to one of the backlight units 000111011001 (here, 1 is the least significant bit and 0 is the most significant bit) is taken as an example, and the display method will be illustrated in the following disclosure.

In this embodiment, the sub-illuminating data corresponding to sub-period 1 having $2^0$ secondary sub-period is 01 (the sub-illuminating data is the $0^{th}$ bit and the $1^{st}$ bit of the illuminating data DATA), the sub-illuminating data corresponding to sub-period 2 having $2^1$ secondary sub-period is 10 (the sub-illuminating data is the $2^{nd}$ bit and the $3^{rd}$ bit of the illuminating data DATA), the sub-illuminating data corresponding to sub-period 3 having $2^2$ secondary sub-period is 01 (the sub-illuminating data is the $4^{th}$ bit and the $5^{th}$ bit of the illuminating data DATA), etc . . . , and the sub-illuminating data corresponding to sub-period 6 having $2^5$ secondary sub-period is 00 (the sub-illuminating data is the $10^{th}$ bit and the $11^{th}$ bit of the illuminating data DATA).

In the second input step S103, in the sub-period 1, the scan signal is inputted into the scan line corresponding to the backlight units for $2^0$ times (once) such that the sub-illuminating data 01 corresponding to the sub-period 1 is inputted to the backlight units for once. In the sub-period 2, the scan signal is inputted into the scan line corresponding to the backlight units for $2^1$ times (twice) such that the sub-illuminating data 10 corresponding to the sub-period 2 is inputted to the backlight units for twice. In the sub-period 3, the scan signal is inputted into the scan line corresponding to the backlight units for $2^2$ times (4 times) such that the sub-illuminating data 01 corresponding to the sub-period 3 is inputted to the backlight units for 4 times, etc . . . . In the sub-period 6, the scan signal is inputted into the scan line corresponding to the backlight units for $2^5$ times (32 times) such that the sub-illuminating data 00 corresponding to the sub-period 6 is inputted to the backlight units for 32 times.

In contrast to the conventional art, the present disclosure provides a display method. The display method is used in a display panel including a plurality of backlight units and a scan line and a data line electrically connected to the plurality of backlight units. The display method includes: obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels; inputting the plurality of illuminating data into the data lines; and when each of the plurality of the sub-periods begins, inputting a scan signal into the scan line to allow the plurality of backlight units to receive the plurality of sub-illuminating data. In the display method of the present disclosure, because at least two sub-periods have different time duration and the sub-illuminating data correspond to the data voltages of different voltage levels such that at least two sub-illuminating data of the illuminating data corresponding to each of the backlight unit are applied on the backlight units in different time durations. This could more accurately charge the backlight units under different gray values because time durations of at least two sub-periods are not equal such that the above-mentioned unsmooth transition between different gray values could be alleviated.

Figure 3:
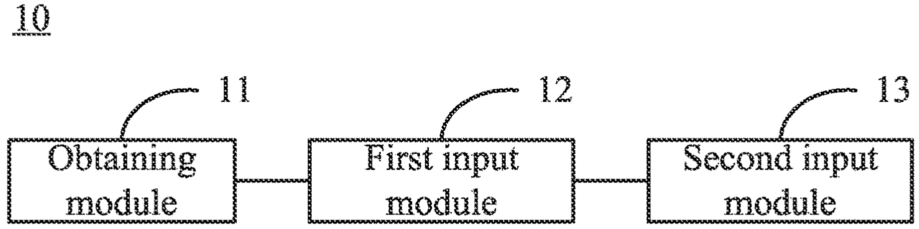
FIG. 3 is a diagram of a display device according to an embodiment of the present disclosure.

Please refer to FIG. 3. FIG. 3 is a diagram of a display device 10 according to an embodiment of the present disclosure. The display device 10 is used in a display panel including a plurality of backlight units and a scan line and a data line electrically connected to the plurality of backlight units. FIG. 3 depicts the components and the connections among the component in this embodiment.

As shown in FIG. 3, the display device 10 includes: an obtaining module 11, a first inputting module 12 and a second inputting module 13.

The obtaining module 11 is configured to obtain a plurality of illuminating data corresponding to the plurality of backlight units. The plurality of illuminating data are configured for the plurality of backlight units to display a frame within a predetermined time period. The predetermined time period is divided to a plurality of sub-periods. At least two of the sub-periods are not equal. The plurality of illuminating data include a plurality of sub-illuminating data corresponding to the plurality of sub-periods, and the plurality of sub-illuminating data correspond to data voltages of different voltage levels.

The first input module 12 is configured to input the plurality of illuminating data into the data lines.

The second input module 13 is configured to input a scan signal into the scan line to allow the plurality of backlight units to receive the plurality of sub-illuminating data when each of the plurality of the sub-periods begins.

The obtaining module 11 could obtain a plurality of illuminating data from a timing controller or a field programmable gate array (FPGA). In this embodiment, the illuminating data corresponding to each of the backlight units have A bits (that is, $0^{th}$ bit to $(A-1)^{th}$ bit). Each of the A bits carries a binary datum 0 or 1. The $0^{th}$ bit is the least significant bit and the $(A-1)^{th}$ bit is the most significant bit. At this time, each backlight unit includes $2^A$ gray values. That is, each of the backlight units could generate light of $2^A$ different luminance levels.

The predetermined time period for the backlight units to display a frame could be divided into B sub-periods. Corresponding to the B sub-periods, the illuminating data having A bits could be divided into B sub-illuminating data. Each of the B sub-illuminating data has A/B bits. Accordingly, the B sub-illuminating data have different data voltages of $2^{A/B}$ different voltage levels.

In this embodiment, the lower bits have lower luminance contribution in each illuminating data and the higher bits have higher luminance contribution in each illuminating data when the backlight units display images. Therefore, the time duration of the lower bits should be applied for a shorter time period than that of the higher bits. In addition, because each of the illuminating data is outputted in an order from its lower bits to its higher bits, the time duration of the B sub-periods increases from its first sub-period to the $B^{th}$ sub-period. In another embodiment, in each of the illuminating data, if the lower bits also have lower luminance contribution in each illuminating data and the higher bits also have higher luminance contribution, the time duration of B sub-periods could be divided as follows: the time duration of the sub-period corresponding to the sub-illuminating data of lower bits could be longer than the time duration of the sub-period corresponding to the sub-illuminating data of higher bits. For example, the first B/2 sub-periods could have the same time duration, the last B/2 sub-periods could have the same time duration, and the time duration of the first B/2 sub-periods is shorter than the time duration of the last B/2 sub-periods. Please note, the luminance contribution of each of the bits of the illuminating data could be obtained by the processor when the processor obtains each of the illuminating data.

On the other hand, in each of the illuminating data, if the lower bits also have higher luminance contribution in each illuminating data and the higher bits also have lower luminance contribution, the time duration of B sub-periods should be divided as follows: the time duration of the sub-period corresponding to the sub-illuminating data of lower bits could be shorter than the time duration of the sub-period corresponding to the sub-illuminating data of higher bits.

In each of the illuminating data, if the lower bits have lower luminance contribution in each illuminating data, the middle bits have middle luminance contribution, and the higher bits have higher luminance contribution, the time duration of B sub-periods should be divided as follows: the time duration of the sub-period corresponding to the sub-illuminating data of lower bits could be comparatively shorter, the time duration of the sub-period corresponding to the sub-illuminating data of middle bits could be comparatively middle, and the time duration of the sub-period corresponding to the sub-illuminating data of middle bits could be comparatively longer.

The processor divides the time duration of the sub-periods according to the luminance contribution of each of the bits in the illuminating data.

In this embodiment, the predetermined time is divided into a plurality of secondary sub-periods. The $N^{th}$ sub-period of above-mentioned B sub-periods has $2^{N-1}$ secondary sub-periods.

The second input module 13 includes: a sub-field input unit configured to input the scan signal into the scan line at the beginning of each of the plurality of the secondary sub-periods of the $N^{th}$ sub-period, so as to input the plurality of sub-illuminating data corresponding to the $N^{th}$ sub-period to the plurality of backlight units $2^{N-1}$ times.

For example, each illuminating data corresponding to each backlight unit has 12 bits. The predetermined time for the backlight units to displaying a frame is divided into 6 sub-periods. Corresponding to the 6 sub-periods, the illuminating data of the 12 bits are divided into 6 sub-illuminating data. Each of the sub-illuminating data has 2 bits. At this time, the 6 sub-illuminating data has 4 data voltages of different voltage levels. That is, the sub-illuminating data could be 00, 01, 10 or 11, corresponding to 4 different data voltage V1, V2, V3 and V4 having different voltage levels.

The sub-period 1 has $2^0$ secondary sub-period, the sub-period 2 has $2^1$ secondary sub-periods, the sub-period 3 has $2^2$ secondary sub-periods, etc . . . and the sub-period 6 has $2^5$ secondary sub-periods.

Please refer to FIG. 2. The illuminating data (DATA) corresponding to one of the backlight units 000111011001 (here, 1 is the least significant bit and 0 is the most significant bit) is taken as an example, and the display method will be illustrated in the following disclosure.

In this embodiment, the sub-illuminating data corresponding to sub-period 1 having $2^0$ secondary sub-period is 01 (the sub-illuminating data is the $0^{th}$ bit and the $1^{st}$ bit of the illuminating data DATA), the sub-illuminating data corresponding to sub-period 2 having $2^1$ secondary sub-period is 10 (the sub-illuminating data is the $2^{nd}$ bit and the $3^{rd}$ bit of the illuminating data DATA), the sub-illuminating data corresponding to sub-period 3 having $2^2$ secondary sub-period is 01 (the sub-illuminating data is the $4^{th}$ bit and the $5^{th}$ bit of the illuminating data DATA), etc . . . , and the sub-illuminating data corresponding to sub-period 6 having $2^5$ secondary sub-period is 00 (the sub-illuminating data is the $10^{th}$ bit and the $11^{th}$ bit of the illuminating data DATA).

In the sub-period 1, the scan signal is inputted into the scan line corresponding to the backlight units for $2^0$ times (once) such that the sub-illuminating data 01 corresponding to the sub-period 1 is inputted to the backlight units for once. In the sub-period 2, the scan signal is inputted into the scan line corresponding to the backlight units for $2^1$ times (twice) such that the sub-illuminating data 10 corresponding to the sub-period 2 is inputted to the backlight units for twice. In the sub-period 3, the scan signal is inputted into the scan line corresponding to the backlight units for $2^2$ times (4 times) such that the sub-illuminating data 01 corresponding to the sub-period 3 is inputted to the backlight units for 4 times, etc . . . . In the sub-period 6, the scan signal is inputted into the scan line corresponding to the backlight units for $2^5$ times (32 times) such that the sub-illuminating data 00 corresponding to the sub-period 6 is inputted to the backlight units for 32 times.

In contrast to the conventional art, the display device 10 of the present disclosure used in a display panel that includes a plurality of backlight units and a scan line and a data line electrically connected to the plurality of backlight units. The display device includes: an obtaining module, configured to obtain a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data include a plurality of sub-illuminating data corresponding to the plurality of sub-periods, and the plurality of sub-illuminating data correspond to data voltages of different voltage levels; a first input module, configured to input the plurality of illuminating data into the data lines; and a second input module, configured to input a scan signal into the scan line to allow the plurality of backlight units to receive the plurality of sub-illuminating data when each of the plurality of the sub-periods begins. Because at least two sub-periods have different time duration and the sub-illuminating data correspond to the data voltages of different voltage levels such that at least two sub-illuminating data of the illuminating data corresponding to each of the backlight unit are applied on the backlight units in different time durations. This could more accurately charge the backlight units under different gray values because time durations of at least two sub-periods are not equal such that the above-mentioned unsmooth transition between different gray values could be alleviated.

Figure 4:
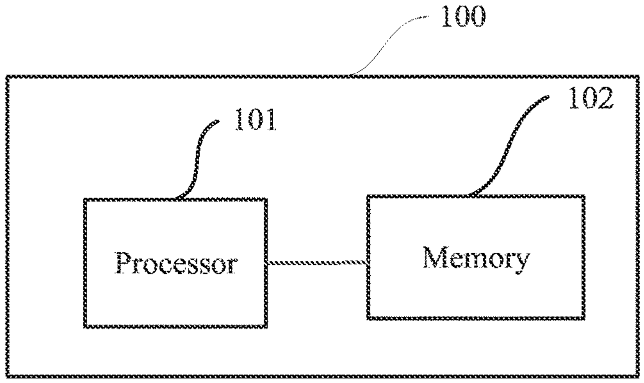
FIG. 4 is a diagram of a mobile terminal according to an embodiment of the present disclosure.

FIG. 4 is a diagram of a mobile terminal according to an embodiment of the present disclosure. The above display method and the display device 10 are used in the mobile terminal. The mobile terminal could be a smart phone or a tablet. FIG. 4 depicts the components and the connections among the component in this embodiment.

The mobile terminal 100 includes a processor 101 and a storage device 102. The storage device 102 is electrically connected to the processor 101.

The processor 101 is the control center of the mobile terminal 100. The processor 101 connects to the other components of the mobile terminal through all kinds of wires and buses. The processor 101 could execute and load the application programs stored in the storage device 102 and load the data stored in the storage device to perform all kinds of functions and process data of the mobile terminal such that the processor 101 could perform the entire monitoring on the mobile terminal. In addition, the mobile terminal 100 includes the above-mentioned display device. The display device could perform any of the above-mentioned display methods.

Figure 5:
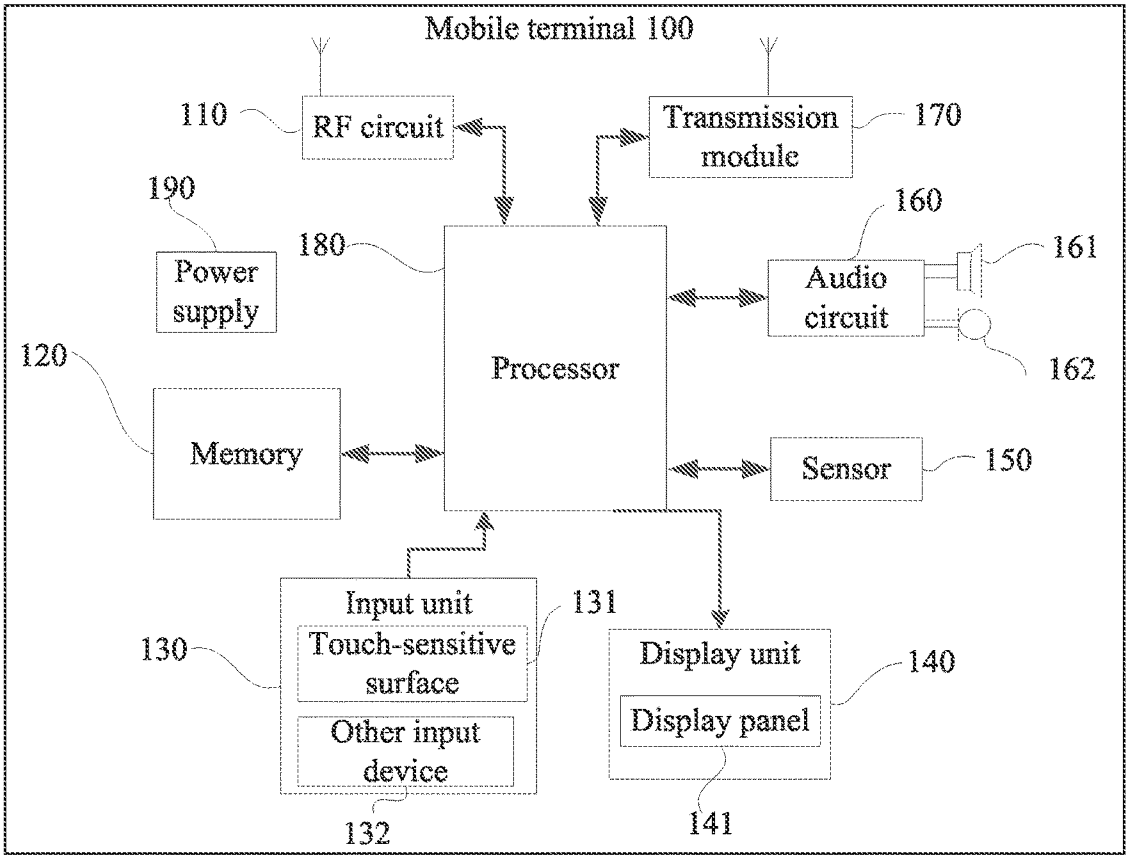
FIG. 5 is a functional block diagram of a mobile terminal according to an embodiment of the present disclosure.

Please refer to FIG. 5. FIG. 5 is a functional block diagram of a mobile terminal 100 according to an embodiment of the present disclosure. The mobile terminal could be a smart phone or a tablet. FIG. 5 depicts the components and the connections among the component in this embodiment.

The mobile terminal 100 includes a radio frequency (RF) circuit 110, one or more storage devices (computer readable medium) 120, an input unit 130, a display unit 140, a sensor 150, an audio circuit 160, a WiFi (wireless fidelity) module 170, one or more processors 180 and a power supply 190.

FIG. 5 is a block diagram of a mobile terminal 100 according to one embodiment of the present disclosure. The mobile terminal 100 may be a smart phone or a tablet computer.

As shown in FIG. 5, the mobile terminal 100 may include components, such as a radio frequency (RF) circuit 110, a memory 120, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 100 is not limited to the structure of the mobile terminal 100 shown in FIG. 5. The mobile terminal 100 may include more or less components than those illustrated in the figure, or some components may be combined, or may have different components arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VOIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 100, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the mobile terminal 100. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 5, the touch-sensitive surface 131 and the display panel 141 are used as two separate parts to implement input and output functions, in some embodiments, the touch-sensitive surface 131 and the display panel 141 may be integrated to implement the input and output functions.

The mobile terminal 100 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the mobile terminal 100 is moved to the car. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal 100 are not further described herein.

The audio circuit 160, a loudspeaker 161, and a microphone 162 may provide audio interfaces between the user and the mobile terminal 100. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an carplug jack, so as to provide communication between a peripheral carphone and the mobile terminal 100.

The mobile terminal 100 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the mobile terminal 100, and can be ignored according to demands without changing the scope of the essence of the present disclosure.

The processor 180 is a control center of the mobile terminal 100, and connects various parts of the terminal by using various interfaces and lines. By running or executing the software program and/or module stored in the memory 120, and invoking data stored in the memory 120, the processor 180 performs various functions and data processing of the mobile terminal 100, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The mobile terminal 100 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the mobile terminal 100 may further include a camera (a front camera or a rear camera), a Bluetooth module, and the like, which are not further described herein. Specifically, in this embodiment, the display unit of the mobile terminal 100 is a touch screen display.

In addition, the mobile terminal 100 includes the above-mentioned display device used in the display panel 141. The display device could perform any of the above-mentioned display methods.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A display method used in a display panel, the display panel comprising a plurality of backlight units and a scan line and a data line electrically connected to the plurality of backlight units, the display method comprising:

obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data comprise a plurality of sub-illuminating data corresponding to the plurality of sub-periods, and the plurality of sub-illuminating data correspond to data voltages of different voltage levels;

inputting the plurality of illuminating data into the data lines; and when each of the plurality of the sub-periods begins, inputting a scan signal into the scan line to allow the plurality of backlight units to receive the plurality of sub-illuminating data, wherein the predetermined time period is divided into a plurality of equal secondary sub-periods, and an $N^{th}$ sub-period of the plurality of sub-periods comprises $2^{N-1}$ of the secondary sub-periods.

2. The display method of claim 1, wherein the step of inputting the scan signal into the scan line to allow the plurality of backlight units to receive the plurality of sub-illuminating data when each of the plurality of the sub-periods begins comprises:

inputting the scan signal into the scan line to allow the plurality of backlight units when each of the plurality of the sub-periods of the $N^{th}$ sub-period begins such that the plurality of the secondary sub-illuminating data corresponding to the $N^{th}$ sub-period to the plurality of backlight units.

3. The display method of claim 1, wherein each of the illuminating data comprises A bits, a number of the sub-periods is B, and each of the sub-illuminating data comprises A/B bits.

4. The display method of claim 3, wherein the plurality of sub-illuminating data of the illuminating data comprises $2^{A/B}$ different data voltages of different voltage levels.

5. The display method of claim 3, wherein time durations of the plurality of the sub-periods gradually increase from a first sub-period to a $B^{th}$ sub-period.

6. The display method of claim 3, wherein each of the bits of the illuminating data comprises a corresponding luminance contribution, and time durations of the sub-periods are directly proportional to the luminance contribution of the bits of the corresponding sub-illuminating data.

7. A display device, used in a display panel, the display panel comprising a plurality of backlight units and a scan line and a data line electrically connected to the plurality of backlight units, the display device comprising: an obtaining module, obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data comprise a plurality of sub-illuminating data corresponding to the plurality of sub-periods, and the plurality of sub-illuminating data correspond to data voltages of different voltage levels, wherein the obtaining module comprises a timing controller or a field programmable gate array (FPGA); a first input module inputting the plurality of illuminating data into the data lines; and a second input module inputting a scan signal into the scan line to allow the plurality of backlight units to receive the plurality of sub-illuminating data when each of the plurality of the sub-periods begins; wherein the predetermined time period is further divided into a plurality of equal secondary sub-periods, and an Nth sub-period of the plurality of sub-periods comprises $2^{N-1}$ of the secondary sub-periods.

8. The display device of claim 7, wherein the second input module comprises:

a sub-field input unit configured to input the scan signal into the scan line at the beginning of each of the plurality of secondary sub-periods of the sub-period, so as to input the plurality of the secondary sub-illuminating data corresponding to the $N^{th}$ sub-period to the plurality of backlight units $2^{N-1}$ times.

9. The display device of claim 7, wherein each of the illuminating data comprises A bits, a number of the sub-periods is B, and each of the sub-illuminating data comprises A/B bits.

10. The display device of claim 9, wherein the plurality of sub-illuminating data of the illuminating data comprises $2^{A/B}$ different data voltages of different voltage levels.

11. The display device of claim 9, wherein time durations of the plurality of the sub-periods gradually increase from a first sub-period to a $B^{th}$ sub-period.

12. The display device of claim 9, wherein each of the bits of the illuminating data comprises a corresponding luminance contribution, and time durations of the sub-periods are directly proportional to the luminance contribution of the bits of the corresponding sub-illuminating data.

13. A mobile terminal, comprising a display device used in a display panel that comprises a plurality of backlight units, a scan line and a data line electrically connected to the plurality of backlight units, the display device comprising: an obtaining module obtaining a plurality of illuminating data corresponding to the plurality of backlight units, the plurality of illuminating data are configured for the plurality of backlight units to display a frame within a predetermined time period, wherein the predetermined time period is divided to a plurality of sub-periods, at least two of the sub-periods are not equal, the plurality of illuminating data comprise a plurality of sub-illuminating data corresponding to the plurality of sub-periods, and the plurality of sub-illuminating data correspond to data voltages of different voltage levels, wherein the obtaining module comprises a timing controller or a field programmable gate array (FPGA); a first input module inputting the plurality of illuminating data into the data lines; and a second input module inputting a scan signal into the scan line to allow the plurality of backlight units to receive the plurality of sub-illuminating data when each of the plurality of the sub-periods begins; wherein the predetermined time period is further divided into a plurality of equal secondary sub-periods, and an Nth sub-period of the plurality of sub-periods comprises $2^{N-1}$ of the secondary sub-periods.

14. The mobile terminal of claim 13, wherein the second input module comprises:

a sub-field input unit configured to input the scan signal into the scan line at the beginning of each of the plurality of secondary sub-periods of the sub-period, so as to input the plurality of the secondary sub-illuminating data corresponding to the $N^{th}$ sub-period to the plurality of backlight units $2^{N-1}$ times.

15. The mobile terminal of claim 13, wherein each of the illuminating data comprises A bits, a number of the sub-periods is B, and each of the sub-illuminating data comprises A/B bits.

16. The mobile terminal of claim 15, wherein the plurality of sub-illuminating data of the illuminating data comprises $2^{A/B}$ different data voltages of different voltage levels.

17. The mobile terminal of claim 15, wherein each of the bits of the illuminating data comprises a corresponding luminance contribution, and time durations of the sub-periods are directly proportional to the luminance contribution of the bits of the corresponding sub-illuminating data.

* * * * *